United States Patent [19]
Nishio

[11] Patent Number: 5,741,203
[45] Date of Patent: Apr. 21, 1998

[54] AUTOMATIC TRANSMISSION CONTROL APPARATUS

[75] Inventor: Motoharu Nishio, Yokohama, Japan

[73] Assignee: Nissan Motor Co., Ltd., Yokohama, Japan

[21] Appl. No.: 662,369

[22] Filed: Jun. 12, 1996

[30] Foreign Application Priority Data

Jun. 12, 1995 [JP] Japan .................................. 7-144707

[51] Int. Cl.$^6$ ................................................ F16H 61/06
[52] U.S. Cl. ................................................ 477/154; 477/120
[58] Field of Search ................................ 477/154, 155, 477/143, 120

[56] References Cited

U.S. PATENT DOCUMENTS

| | | | |
|---|---|---|---|
| 3,719,096 | 3/1973 | Sprague et al. | 477/120 |
| 3,956,947 | 5/1976 | Leising et al. | 477/120 |
| 5,086,670 | 2/1992 | Nitz et al. | 477/154 |
| 5,345,842 | 9/1994 | Kondo | 477/154 |

Primary Examiner—Charles A. Marmor
Assistant Examiner—Sherry Lynn Estremsky
Attorney, Agent, or Firm—Foley & Lardner

[57] ABSTRACT

An apparatus for controlling an automatic transmission including hydraulic friction elements each of which is operable between engaged and disengaged positions in response to a working pressure of hydraulic fluid supplied thereto so as to produce a selected one of a plurality of modes of gear change. The control apparatus is operable through successive operating modes including a precharge mode of precharging the hydraulic fluid to a corresponding one of the friction elements to complete a loss stroke of the friction element, a critical pressure retaining mode of retaining the working pressure at a critical value and a feedback control mode of controlling the working pressure. A different of the rate of change of the friction element input side speed sensed during the critical pressure retaining mode from the average rate of change of the friction element input side speed sensed during the precharge mode is calculated. The critical working pressure value is corrected in a direction to decrease the calculated difference.

8 Claims, 8 Drawing Sheets

|  |  | C1 | C2 | C3 | B1 (OWC) | B2 |
|---|---|---|---|---|---|---|
| FORWARD | 1ST | × | × | ○ | ○ | × |
| | 2ND | × | × | ○ | × | ○ |
| | 3RD | × | ○ | ○ | × | × |
| | 4TH | × | ○ | × | × | ○ |
| REVERSE | | ○ | × | × | ○ | × |

○ = ENGAGED

AUTOMATIC TRANSMISSION CONTROL APPARATUS

BACKGROUND OF THE INVENTION

This invention relates to an apparatus for controlling an automatic transmission including hydraulic friction elements operable between engaged and disengaged positions to produce a selected one of a plurality of modes of gear change.

For example, Japanese Patent Kokai No. 1-299351 discloses an automatic transmission control apparatus for controlling the working pressure PA applied to operate each of the friction elements, such as wet friction clutches, wet friction brakes and the like, between engaged and disengaged positions to produce a selected one of a plurality of modes of gear change. The automatic transmission control apparatus operates in a precharge mode of introducing an increased working pressure PA to the friction element for a predetermined period of time after a gear change command is produced to complete a lose stroke of the friction element in a short time. The precharge mode is followed by a critical pressure retaining mode of retaining the working pressure PA at a predetermined critical value Px, that is, the value close to the greatest possible value at which the friction element still remains in its disengaged position, until the working pressure is controlled to engage the friction element in a feedback control mode. In the feedback control mode, the working pressure PA is controlled in connection with the open pressure PR in such a manner that the effective gear ratio Ni/No of the transmission input shaft speed Ni with respect to the transmission output shaft speed changes in a desired fashion with time.

With such a conventional automatic transmission control apparatus, the loss stroke of each of the friction elements can be completed in a short time. This is effective to improve the response speed to a gear change command. Furthermore, the critical pressure retaining mode made between the precharge mode and the feedback control mode can reduce shocks which may occur during the gear changing operation to some extent. Since the working pressure is retained at a predetermined critical value Px over the whole period of the critical pressure retaining mode, however, it is not ensure whether the gear changing operation can be made with no shock.

SUMMARY OF THE INVENTION

It is a main object of the invention to provide an improved automatic transmission control apparatus which can control the working pressure at an appropriate critical value during the critical pressure retaining mode to realize smooth gear changing operation.

There is provided, in accordance with the invention, an apparatus for use with an automatic transmission including hydraulic friction elements having input and output sides. Each of the friction elements is operable between engaged and disengaged positions in response to a working pressure of hydraulic fluid supplied thereto so as to produce a selected one of a plurality of modes of gear change in the automatic transmission. The apparatus comprises a control unit operable through successive operating modes including a precharge mode of precharging the hydraulic fluid to a corresponding one of the friction elements to complete a loss stroke of the friction element, a critical pressure retaining mode of retaining the working pressure at a critical value and a feedback control mode of controlling the working pressure, and means for sensing a speed of the input side of the friction element. The control unit includes means for detecting an average rate of change of the sensed friction element input side speed during the precharge mode, means for detecting a rate of change of the sensed friction element input side speed during the critical pressure retaining mode, means for calculating a difference of the detected friction element input side speed changing rate from the detected average friction element input side speed changing rate, and means for correcting the critical working pressure value in a direction to decrease the calculated difference.

BRIEF DESCRIPTION OF THE DRAWINGS

This invention will be described in greater detail by reference to the following description taken in connection with the accompanying drawings, in which like reference numerals identify like elements in the several figures and in which.

DETAILED DESCRIPTION OF THE INVENTION

Figure 1:
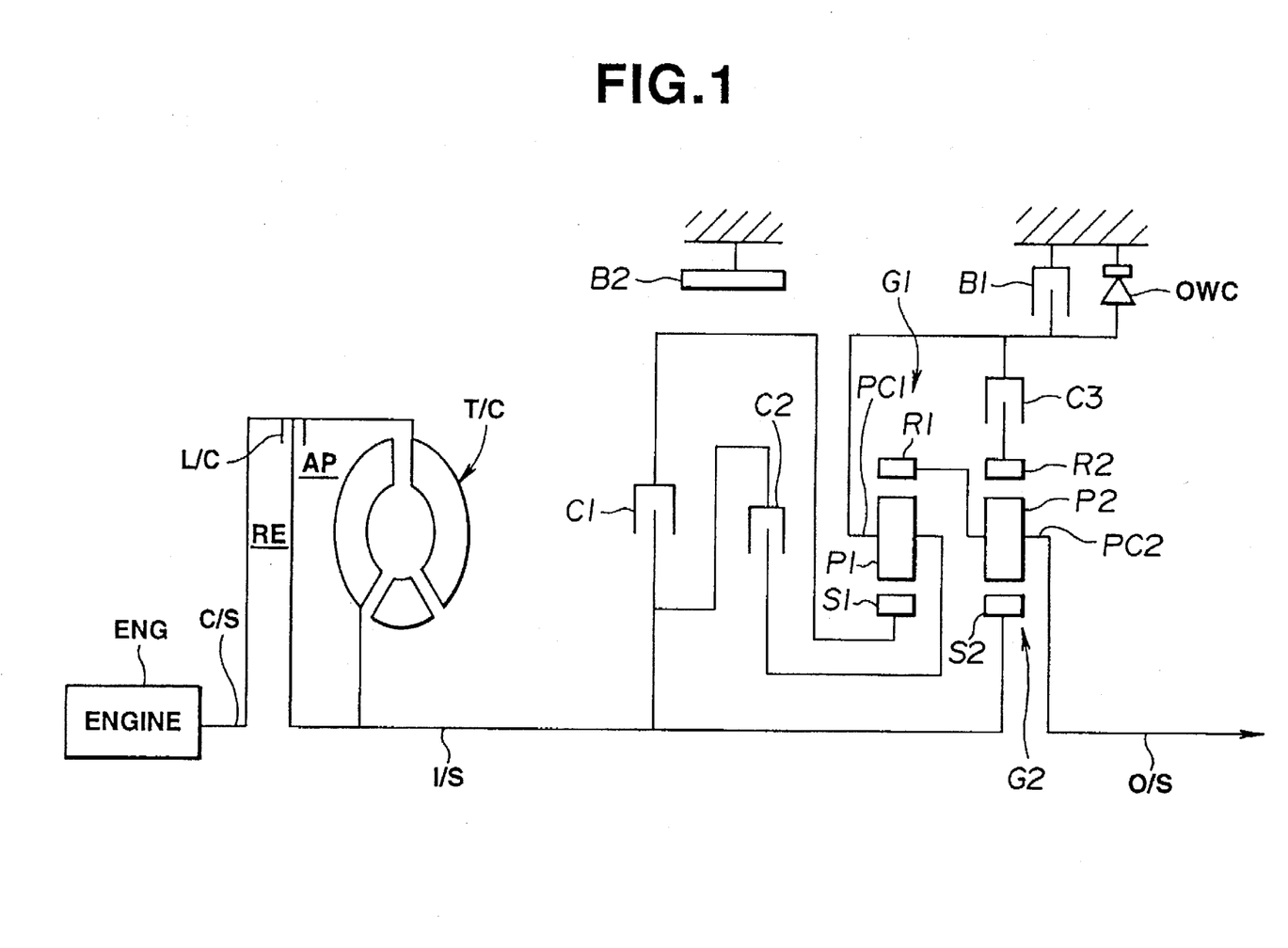
FIG. 1 is a schematic diagram showing an automatic transmission to which the invention is applicable.

With reference to the drawings and, in particular to FIG. 1, there is shown a schematic diagram of an automatic transmission to which the control apparatus of the invention is applicable. A drive is transmitted from an engine ENG through an engine crankshaft C/S to a torque converter T/C of the type including an input element, an output element and a lockup clutch L/C. The lockup clutch L/C defines a release chamber RE on the left side thereof, as viewed in FIG. 1, and an apply chamber AP on the right side thereof, as viewed in FIG. 1. A conventional lockup control valve (not shown) is provided for controlling the fluid pressures introduced into the release and apply chambers RE and AP so as to control the degree of slippage of the lockup clutch L/C. The lockup clutch L/C is closed, locked, applied or engaged to complete a mechanical connection between the input and output elements of the torque converter T/C. This mode of operation of the lockup clutch L/C is referred to as a lockup mode. The lockup clutch L/C is opened, unlocked, released or disengaged so that a hydrodynamic driving connection exists between the input and output elements of the torque converter T/C. This mode of operation of the lockup clutch L/C is referred to as a converter mode.

The automatic transmission includes an input shaft I/S to which the drive is transmitted from the torque converter T/C, and an output shaft O/S from which the drive is transmitted to a final drive (not shown). The automatic transmission also includes a first planetary gear unit G1, a second planetary gear unit G2, a first clutch C1, a second clutch C2, a third clutch C3, a first brake B1, a second brake B2 and a one-way clutch OWC. The first planetary gear unit G1 includes a sun gear S1, a ring gear R1, a pinion gear P1 held in mesh engagement with the sun gear S1 and the ring gear R1, and a pinion carrier PC1 which rotatably carries the pinion gear P1. Similarly, the second planetary gear unit G2 includes a sun gear S2, a ring gear R2, a pinion gear P2 held in mesh engagement with the sun gear S2 and the ring gear R2, and a pinion carrier PC2 which rotatably carries the pinion gear P2. The pinion carrier PC1 is connected through the second clutch C2 to the input shaft I/S. The sun gear S1 is connected through the first clutch C1 to the input shaft I/S and it is fixed to the transmission casing through the second brake B1. The pinion carrier PC1 is connected to the ring gear R2 through the third clutch C3 and it is fixed to the transmission casing through the first brake B1. The pinion carrier PC1 is also connected to the transmission casing through the one-way clutch OWC which is directed to permit rotation of the pinion carrier PC1 in the same direction as the engine crankshaft C/S but not vice versa. The ring gear R1 is directly connected to the pinion carrier PC2 for rotation in unison with the output shaft O/S. The sun gear S2 is directly connected to the input shaft I\S for rotation in unison therewith.

Figure 2:
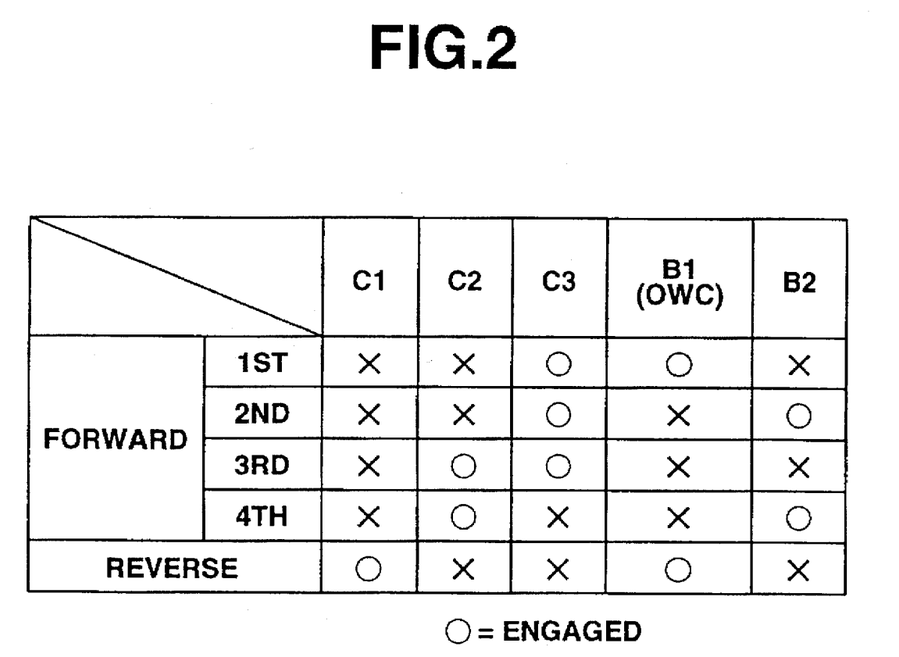
FIG. 2 is a table showing the engaged and disengaged states of the hydraulic friction elements for selected gear positions.

FIG. 2 is a table showing the engaged and disengaged states of the hydraulic friction elements including the first, second and third clutches C1, C2 and C3, and the first and second brakes B1 and B2 for selection of a desired one of gear positions including first-, second-, third- and forth-forward speeds and a reverse position. As can be seen in FIG. 2, the first brake B1 is engaged for the first-forward speed to provide an engine braking function in this gear position.

Figure 3:
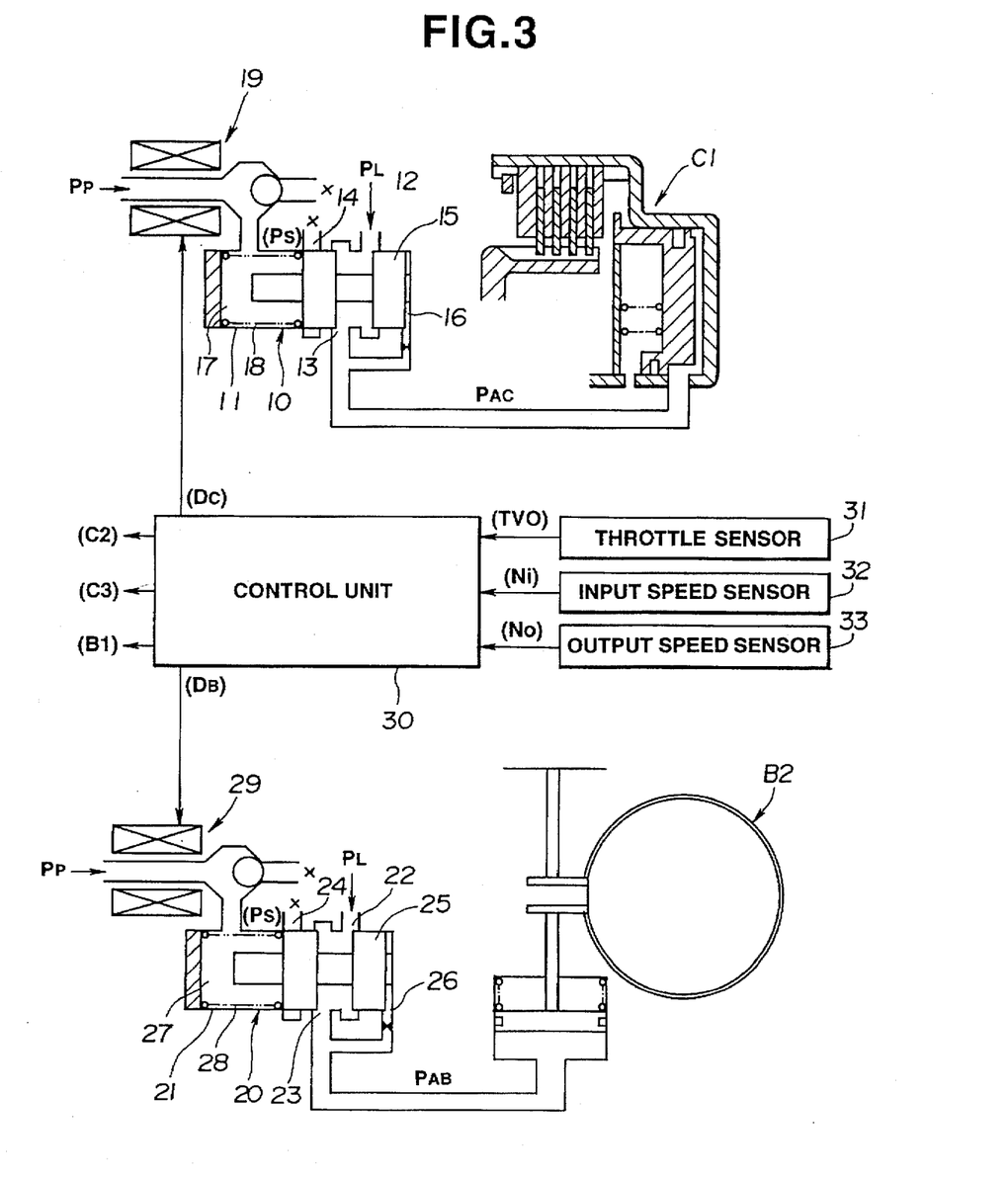
FIG. 3 is a schematic diagram showing a control system for controlling the hydraulic friction elements used in the automatic transmission of FIG. 1.

Referring to FIG. 3, there is illustrated a hydraulic control system capable of engaging and disengaging the hydraulic friction elements of the automatic transmission of FIG. 1. The hydraulic control system includes various components connected to operate the respective friction elements between the engaged and disengaged positions for selection of a desired gear position. For convenience of illustration, however, FIG. 3 shows only two components connected to control the working pressures of hydraulic fluid supplied to the first clutch C1 and the second brake B2. The other components are substantially similar to these components described in connection with FIG. 3.

A pressure regulator valve, generally designated by the numeral 10, includes a housing 11 having an input port 12 through which a line pressure PL is introduced into the housing 11, an output port 13 through which a working pressure PAC is discharged from the housing 11 to operate the first clutch C1, and a drain port 14. A spool 15 is provided in the housing 11 to define first and second chambers 16 and 17 on the opposite sides thereof and it is supported within the housing 11 for reciprocation between first and second positions. In the first position, illustrated in FIG. 3, communication is made between the input and output ports 12 and 13 to increase the working pressure PAC. The working pressure is returned through an orifice into the first chamber 16 to move the spool 15 toward the second position. As the working pressure PAC increases, the output port 13 communicates with the drain port 14 so as to limit the working pressure increase. A bias spring 18 is seated in the second chamber 17 to bias the spool 15 toward its first position. The second chamber 17 is connected to a source of a predetermined pilot pressure PP through a conduit having a solenoid valve 19. The solenoid valve 19 operates on a control signal fed thereto from a control unit 30 to determine the signal pressure Ps to be introduced into the second chamber 17 and thus the working pressure PAC to be introduced into the friction element C1. The signal pressure Ps decreases as the duty ratio Dc of the control signal increases.

A pressure regulator valve, generally designated by the numeral 20, includes a housing 21 having an input port 22 through which a line pressure PL is introduced into the housing 21, an output port 23 through which a working pressure PAC is discharged from the housing 21 to operate the first clutch C1, and a drain port 24. A spool 25 is provided in the housing 21 to define first and second chambers 26 and 27 on the opposite sides thereof and it is supported within the housing 21 for reciprocation between first and second positions. In the first position, illustrated in FIG. 3, communication is made between the input and output ports 22 and 23 to increase the working pressure PAC. The working pressure is returned through an orifice into the first chamber 26 to move the spool 25 toward the second position. As the working pressure PAC increases, the output port 23 communicates with the drain port 24 so as to limit the working pressure increase. A bias spring 28 is seated in the second chamber 27 to bias the spool 25 toward its first position. The second chamber 27 is connected to a source of a predetermined pilot pressure PP through a conduit having a solenoid valve 29. The solenoid valve 29 operates on a control signal fed thereto from the control unit 30 to determine the signal pressure Ps to be introduced into the second chamber 27 and thus the working pressure PAB to be introduced into the friction element B2. The signal pressure Ps decreases as the duty ratio DB of the control signal increases.

The control unit 30 controls the gear changing operation based upon throttle position TVO and transmission output shaft speed No (vehicle speed) in a manner as well known in the art. That is, the control unit 30 selects one of a plurality of modes of gear change suitable for the existing operating conditions and operates the friction elements C1, C2, C3, B1 and B2 to produce the selected one mode of gear change. The control unit 30 also controls the working pressures to operate the respective friction elements C1,C2, C2, B1 and B2 based on transmission input and output shaft speeds Ni and No. For example, the working pressures PAC and PAB, these being determined with the duty ratios Dc and DB of the control signals applied from the control unit 30 to the respective solenoid valves 19 and 29 are repetitively determined from calculations performed in the control unit 30, these calculations being based upon transmission input shaft speed Ni and transmission output shaft speed No. Thus, a throttle valve position sensor 31, a transmission input shaft speed sensor 32 and a transmission output shaft speed sensor 33 are connected to the control unit 30. The throttle valve position sensor 31 is provided to sense the degree to which the engine throttle valve opens and it produces an electric signal indicative of the sensed throttle valve position TVO corresponding to the engine load. The transmission input shaft speed sensor 32 is provided to sense the speed of rotation of the transmission input shaft I/S and it produces an electric signal indicative of the sensed transmission input shaft speed Ni. The transmission output shaft speed sensor 33 is provided to sense the speed of rotation of the transmission output shaft O/S and it produces an electric signal indicative of the sensed transmission output shaft speed No.

The control unit 30 may employ a digital computer which includes a central processing unit (CPU), a read only memory (ROM), a random access memory (RAM), an input interface unit and an output interface unit. The central processing unit communicates with the rest of the computer. The input interface unit includes an analog-to-digital converter which receives analog signals from the throttle valve sensor 31 and other sensors and converts them into digital form for application to the central processing unit. The input interface unit also includes counters which count the pulses fed thereto from the speed sensors 32 and 33 and convert the counts into input and output shaft speed indication digital signals for application to the central processing unit. The read only memory contains the programs for operating the central processing unit and further contains appropriate data in look-up tables used in calculating appropriate values for the duty ratios Dc and DB of the control signals applied to operate the friction elements C1 and B2. Control words specifying desired duty ratios are periodically transferred by the central processing unit to the output interface unit which thereby produces control signals having the duty ratios calculated by the digital computer.

Figure 4:
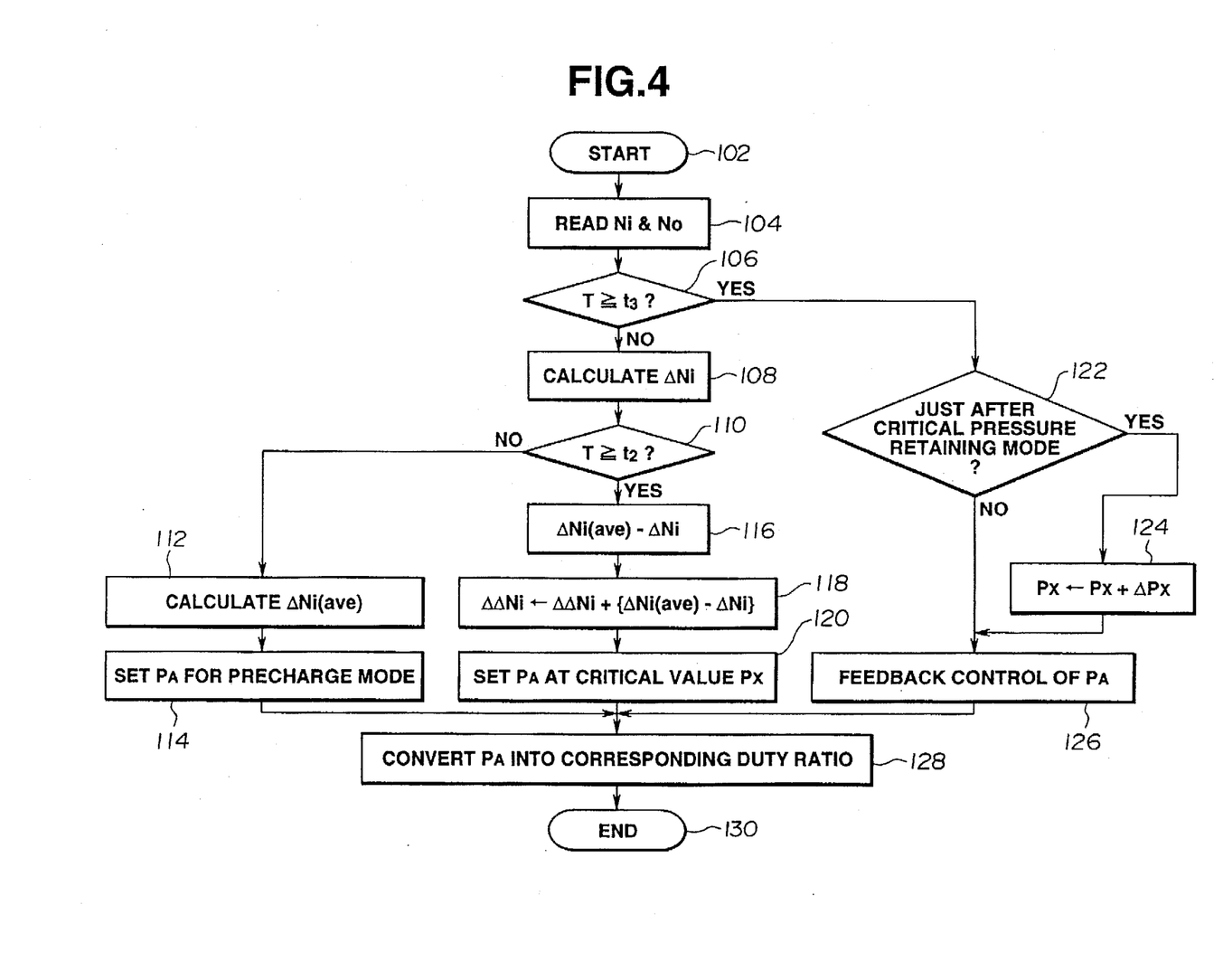
FIG. 4 is a flow diagram illustrating the programming of the digital computer as it is used to calculated desired duty ratios used in controlling the hydraulic friction elements.
Figure 5:
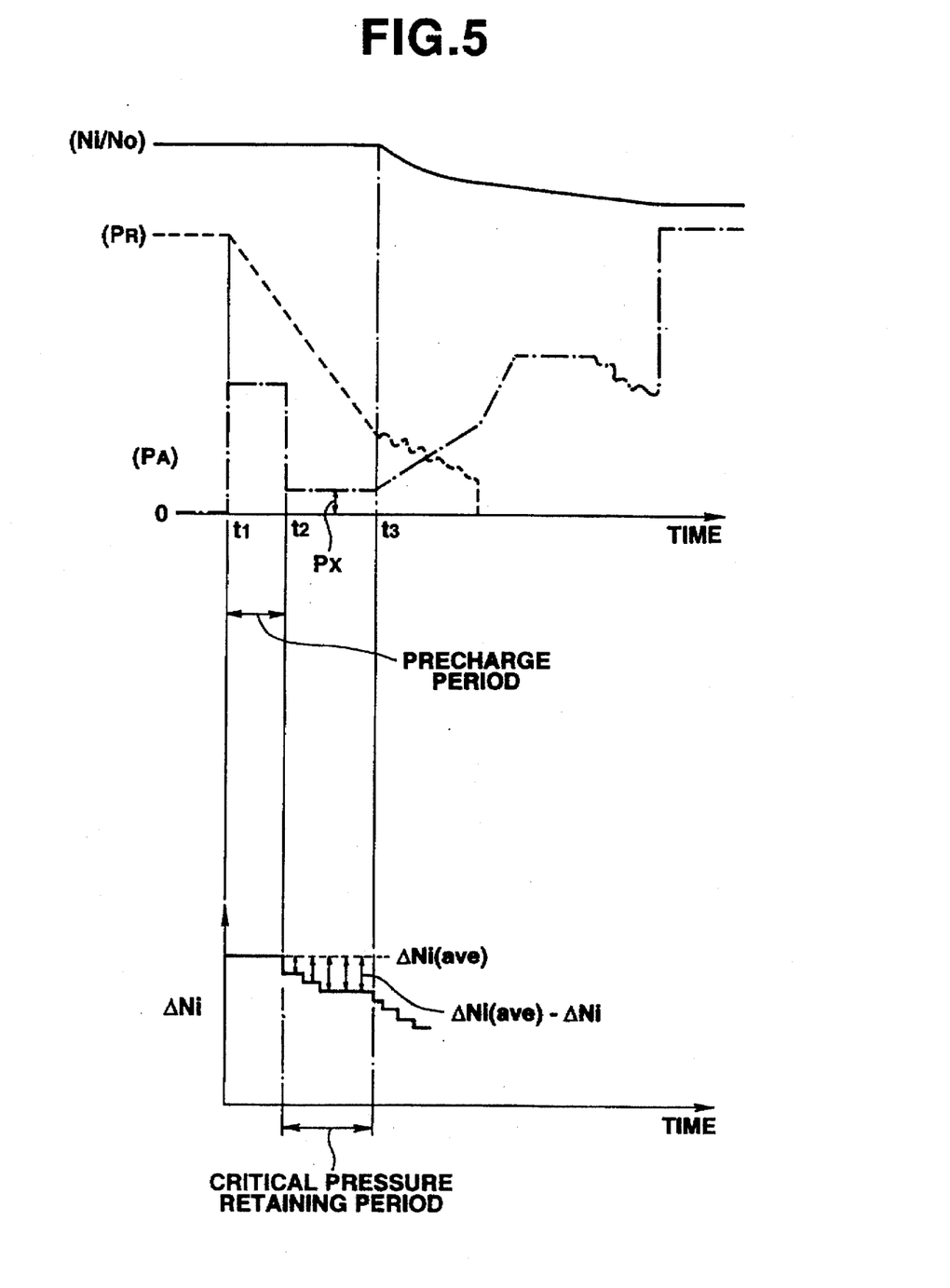
FIG. 5 is a timing chart used in explaining the operation of engaging the hydraulic friction elements.

FIG. 4 is a flow diagram illustrating the programming of the digital computer as it is used to calculate the duty ratios Dc and DB of the control signals to be applied to the solenoid valves 19 and 29. The computer program is entered at the point 102 at uniform intervals of time (sampling interval). At the point 104 in the program, the transmission input and output shaft speeds Ni and No are read into the computer memory. At the point 106, a determination is made as to whether or not the time T elapsed after the time t1 (FIG. 5) at which a command occurs to produce a gear change exceeds a predetermined time t3 (FIG. 5). If the answer to this question is "YES", then it means that the control unit is operating in the feedback control mode and the program proceeds to the point 122. Otherwise, it means that the control unit is operating in the precharge or critical pressure retaining mode and the program proceeds to the point 108 where the rate $\Delta$Ni of change of the transmission input shaft speed Ni, that is, the change $\Delta$Ni of the transmission input shaft speed Ni made in the sampling interval. At the point 110 in the program, a determination is made as to whether or not the time T elapsed after the time t1 exceeds a predetermined time t2 (FIG. 5). If the answer to this question is "YES", then it means that the control unit is operating in the precharge mode and the program proceeds to the point 112. Otherwise, it means that the control unit is operating in the critical pressure retaining mode and the program proceeds to the point 116.

At the point 112 in the program, the average value $\Delta$Ni(ave) of the rate $\Delta$Ni of change of the transmission input shaft speed during the precharge mode is calculated. At the point 114, a target value for the working pressure PA (PAC, PAB) suitable for the precharge mode is calculated. Following this, the program proceeds to the point 128 where the calculated target value for the working pressure PA (PAC, PAB) is converted into a corresponding duty ratio D (Dc, DB). The converted duty ratio D is transferred by the central processsing unit into the output interface unit which thereby produces a control signal having the calculated duty ratio D to the corresponding solenoid valve (19, 20). Following this, the program proceeds to the end points 130.

At the point 116 in the program, a difference ($\Delta$Ni(ave) –$\Delta$Ni) of the transmission input shaft speed changing rate $\Delta$Ni calculated at the point 108 from the average value $\Delta$Ni(ave) calculated at the point 112 is calculated, as shown in FIG. 5. At the point 118, an integrated value $\Delta\Delta$Ni is calculated by numerical integration of the difference ($\Delta$Ni (ave)–$\Delta$Ni) as $\Delta\Delta$Ni→$\Delta\Delta$Ni+[$\Delta$Ni(ave)–$\Delta$Ni]. At the point 120, the working pressure PA (PAC, PAB) is set at a critical pressure value Px. Following this, the program proceeds to the point 128 where the critical pressure value Px set for the working pressure PA (PAC, PAB) is converted into a corresponding duty ratio D (Dc, DB). The converted duty ratio D is transferred by the central processsing unit into the output interface unit which thereby produces a control signal having the calculated duty ratio D to the corresponding solenoid valve (19, 29). Following this, the program proceeds to the end points 130.

At the point 122 in the program, a determination is made as to whether or not it is just after completion of the critical pressure retaining mode. If the answer to this question is "YES", then the program proceeds to the point 124 where the critical pressure value Px is corrected based on the integrated value $\Delta\Delta$Ni as Px←Px+$\Delta$Px. This correction step is made only once just after the critical pressure retaining mode is completed. Otherwise, the program proceeds directly to the point 126 where a feedback control is made to determine the working pressure PA (PAC, PAB). Inn other words, the working pressure PA is calculated to change the effective gear ratio Ni/No, that is, the ratio of the transmission input shaft speed Ni with respect to the transmission output shaft speed No, with time in a predetermined fashion permitting a gear change with no shock. Following this, the program proceeds to the point 128 where the target value set for the control pressure PA is converted into a corresponding duty ratio D. The converted duty ratio D is transferred by the central processsing unit into the output interface unit which thereby produces a control signal having the calculated duty ratio D to the corresponding solenoid valve (19, 29). following this, the program proceeds to the end points 130.

Figure 6:
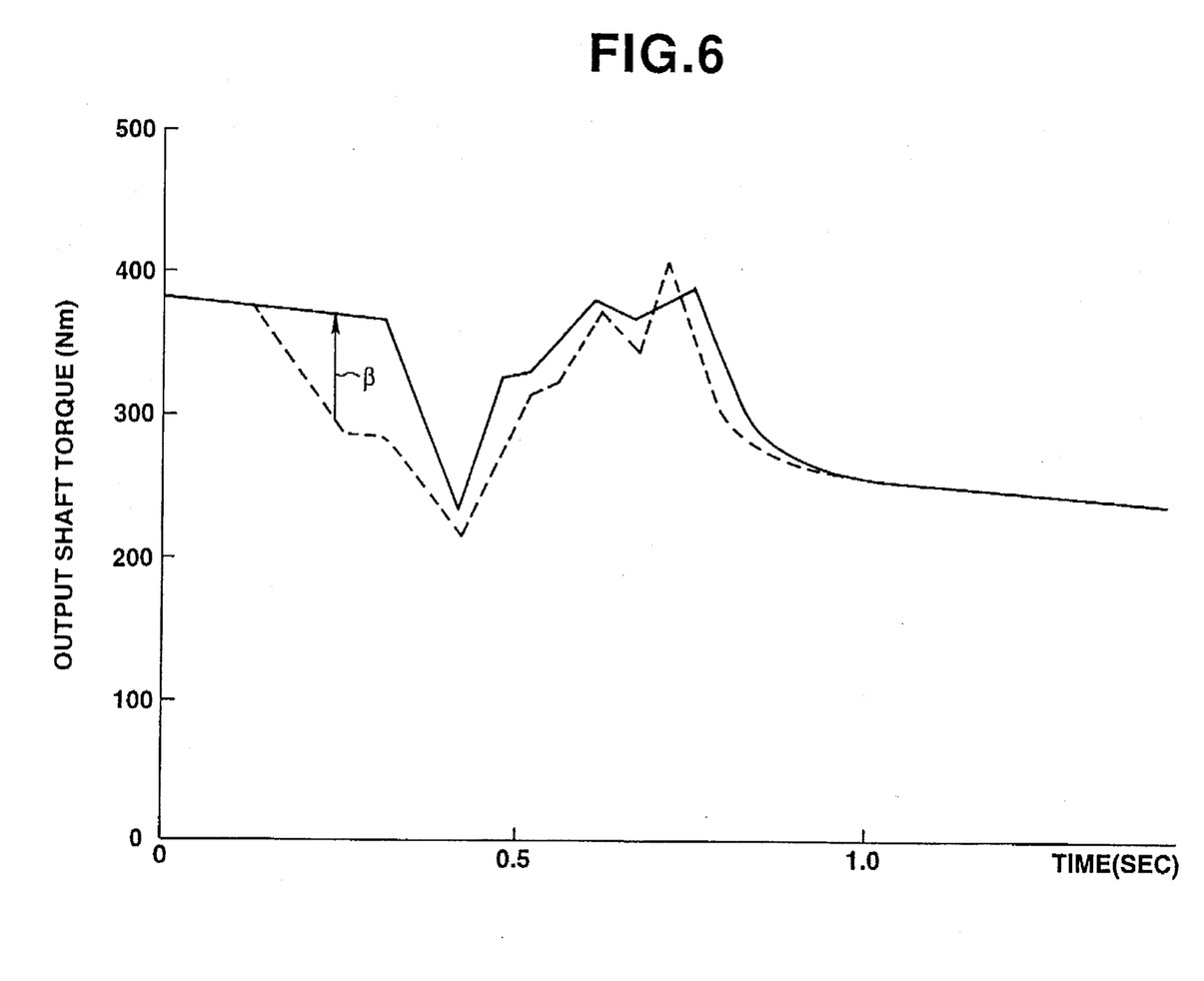
FIG. 6 is a graph showing changes in the automatic transmission output shaft torque with time.

The critical pressure correction step at the point 124 will be described further. Preferably, the critical pressure Px is set in an appropriate range including the greatest possible critical pressure value where the corresponding friction element is still held disengaged. If the critical pressure Px is greater than this appropriate range, a great force will be produced to engage the corresponding friction element during the critical pressure retaining mode. This causes a torque reduction, as indicated by the broken curve of FIG. 6, to provide an undesirable feel of vehicle deceleration to the passenger. If the critical pressure Px is less than the appropriate range, a shock will occur during the gear changing operation. It is impossible to set the critical pressure in the appropriate range with the use of a critical pressure fixed at a constant value. According to the invention, the greatest possible critical pressure value is learned during the cycles of execution of the program of FIG. 4.

Figure 7:
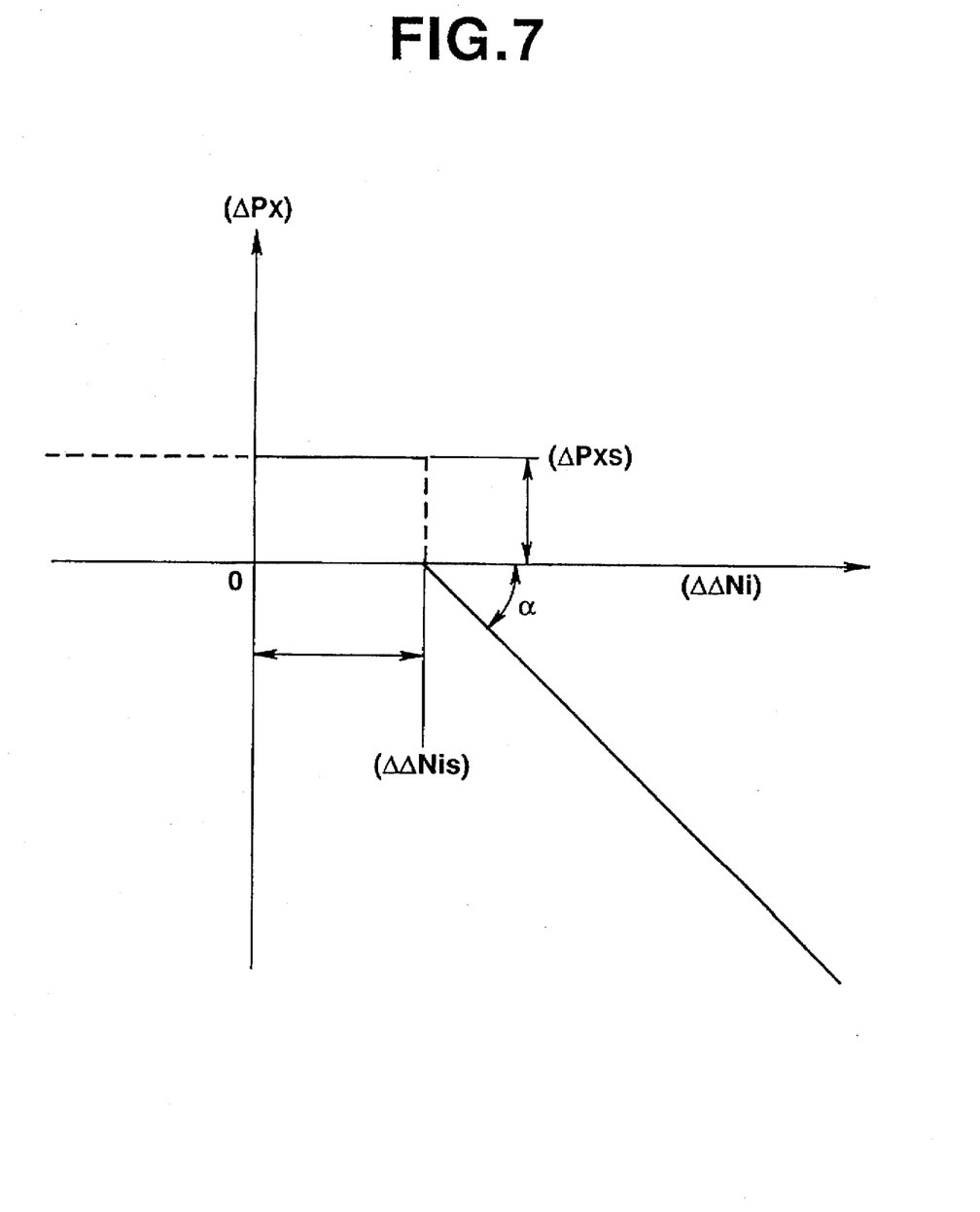
FIG. 7 is a diagram showing a critical working pressure table programmed into the digital computer.

If the critical pressure Px is greater than the appropriate range, a great reduction occurs in the transmission input shaft speed Ni during the critical pressure retaining mode to increase the difference [$\Delta$Ni(ave)–$\Delta$Ni] calculated at the point 117. As a result, the integrated value $\Delta\Delta$Ni calculated at the point 118 increases. It is, therefore, possible to bring the critical pressure Px into the appropriate range by correcting the critical pressure Px based on the integrated value $\Delta\Delta$Ni, as described in connection with the point 124 of the program of FIG. 4. In greater detail, at the point 124, the critical pressure Px is corrected by adding a critical pressure correction factor $\Delta$Px to the last value of the critical pressure. The critical pressure correction factor $\Delta$Px is calculated from a look-up table programmed into the computer. This look-up table defines the critical pressure correction factor $\Delta$Px as a function of integrated value $\Delta\Delta$Ni, as shown in FIG. 7. The critical pressure correction factor $\Delta$Px is set at a predetermined positive value $\Delta$Pxs when the integrated value $\Delta\Delta$Ni is less than a value $\Delta\Delta$Nis corresponding to the margin determined with regard to possible errors which may be introduced in calculating the integrated value $\Delta\Delta$Ni and at a negative value having an absolute value increasing at a rate or gradient $\alpha$ when the integrated value $\Delta\Delta$Ni exceeds the value $\Delta\Delta$Nis. The gradient $\alpha$ is determined based on the moment of inertia of the output element (turbine runner) of the torque converter T/C related to the transmission input shaft I/S, the capacity of engagement of the corresponding friction element, the planetary gear tooth number, the input shaft speed sampling frequency, etc.

At the point 124 in the program, the central processing unit corrects the critical pressure Px, that is, it calculates a new value of the critical pressure Px by adding the critical pressure correction factor $\Delta$Px to the last value of the critical pressure Px. The new critical pressure value is used in the working pressure calculation step at the point 126. The correction is made in such a direction that the value $\Delta\Delta$Ni obtained by the numerical integration of the difference $\Delta$Ni(ave)–$\Delta$Ni decreases to bring the rate $\Delta$Ni of change of the input shaft speed Ni in the critical pressure retaining mode (or period) into coincidence with the average input shaft speed $\Delta$Ni(ave) in the precharge mode (or period). As a result, the critical pressure Px comes into coincidence with the greatest possible value where the corresponding friction element still remains disengaged.

That is, this learning control maintains the critical pressure Px at an optimum value (the greatest possible value). This is effective to prevent the critical pressure Px from exceeding an appropriate range to cause a torque reduction during the critical pressure retaining mode, as indicated by the broken curve of FIG. 6. According to the invention, the output torque is corrected by $\beta$, as indicated by the solid curve of FIG. 6, so as to eliminate the danger of the torque reduction associated with the conventional automatic transmission control apparatus. It is, therefore, possible to engage the corresponding friction element without no great shock.

Furthermore, the critical pressure correction factor $\Delta$Px is set at a positive constant value $\Delta$Pxs when the integrated value $\Delta\Delta$Ni of the difference [$\Delta$Ni(ave)–$\Delta$Ni] is less than a value $\Delta\Delta$Nis corresponding to the margin determined with regard to possible errors which may be introduced upon the numerical integration of the difference [$\Delta$Ni(ave)–$\Delta$Ni]. This provides the following effects:

A negative critical pressure correction factor $\Delta$Px cannot be obtained when the integrated value $\Delta\Delta$Ni is less than the value $\Delta\Delta$Nis. Since the critical pressure correction factor $\Delta$Px is set at a positive constant value $\Delta$Pxs when the integrated value $\Delta\Delta$Ni is less than the value $\Delta\Delta$Nis, critical pressure Px is once corrected in a direction to produce a force to engage the corresponding friction element. As a result, the integrated value $\Delta\Delta$Ni once increases over the value $\Delta\Delta$Nis. This permits the critical pressure learning control as described above.

Figure 8:
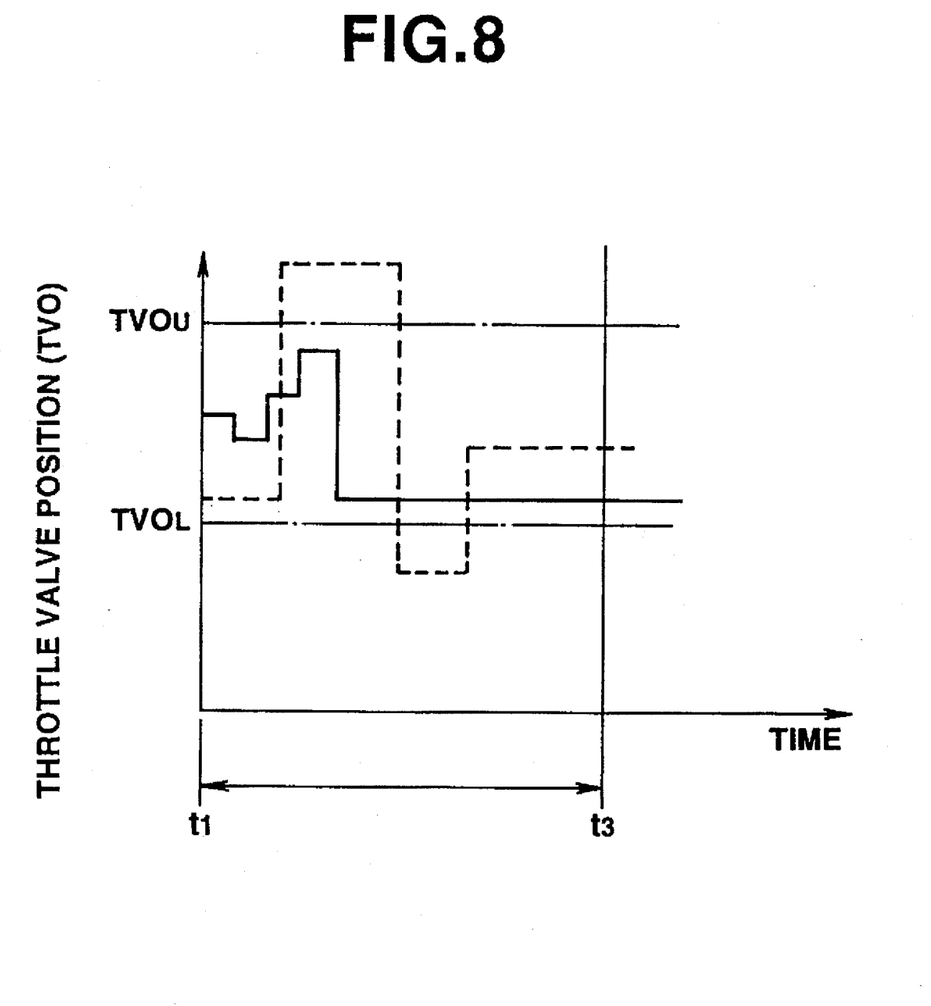
FIG. 8 is a timing chart used in explaining the throttle valve position range permitting critical working pressure learning control.

Preferably, the control unit may be arranged to perform the critical pressure learning control as long as the throttle valve position TVO changes within a predetermined range between values TVOL and TVOU during the precharge and critical pressure retaining periods, that is, the time interval between the times t1 and t3, as indicated by the solid lines of in FIG. 8, and inhibit the critical pressure learning control when the throttle valve position TVO is out of the predetermined range during the time interval between times t1 and t3.

What is claimed is:

1. An apparatus for use with an automatic transmission including hydraulic friction elements having input and output sides, each of the friction elements being operable between engaged and disengaged positions in response to a working pressure of hydraulic fluid supplied thereto so as to produce a selected one of a plurality of modes of gear change in the automatic transmission, comprising:

a control unit operable through successive operating modes including a precharge mode of precharging the hydraulic fluid to a corresponding one of the friction elements to complete a loss stroke of the friction element, a critical pressure retaining mode of retaining the working pressure at a critical value and a feedback control mode of controlling the working pressure;

means for sensing a speed of the input side of the friction element;

the control unit including means for detecting an average rate of change of the sensed friction element input side speed during the precharge mode, means for detecting a rate of change of the sensed friction element input side speed during the critical pressure retaining mode, means for calculating a difference of the detected friction element input side speed changing rate from the detected average friction element input side speed changing rate, and means for correcting the critical working pressure value in a direction to decrease the calculated difference.

2. The automatic transmission control apparatus as claimed in claim 1, wherein the control unit includes means for calculating an integrated value from numerical integration of the calculated difference during the critical pressure retaining mode, and means for correcting the critical working pressure value in a direction to decrease the integrated value.

3. The automatic transmission control apparatus as claimed in claim 2, wherein the control unit includes means for increasing the critical working pressure value when the integrated value is less than a predetermined value.

4. The automatic transmission control apparatus as claimed in claim 3, which includes means for sensing an engine load, and wherein the control unit includes means for detecting a change of the sensed engine load, means for producing a command signal when the detected engine load change exceeds a predetermined value, and means responsive to the command signal for inhibiting the correction of the critical working pressure value.

5. The automatic transmission control apparatus as claimed in claim 2, which includes means for sensing an engine load, and wherein the control unit includes means for detecting a change of the sensed engine load, means for producing a command signal when the detected engine load change exceeds a predetermined value, and means responsive to the command signal for inhibiting the correction of the critical working pressure value.

6. The automatic transmission control apparatus as claimed in claim 1, wherein the control unit includes means for increasing the critical working pressure value when the calculated difference is less than a predetermined value.

7. The automatic transmission control apparatus as claimed in claim 6, which includes means for sensing an engine load, and wherein the control unit includes means for detecting a change of the sensed engine load, means for producing a command signal when the detected engine load change exceeds a predetermined value, and means responsive to the command signal for inhibiting the correction of the critical working pressure value.

8. The automatic transmission control apparatus as claimed in claim 1, which includes means for sensing an engine load, and wherein the control unit includes means for detecting a change of the sensed engine load, means for producing a command signal when the detected engine load change exceeds a predetermined value, and means responsive to the command signal for inhibiting the correction of the critical working pressure value.

* * * * *